Sept. 6, 1960     B. VER NOOY     2,951,255

BALL-TYPE PIPELINE DEVICES

Filed Dec. 30, 1958

Burton Ver Nooy
INVENTOR.

BY
*Browning, Semmes, Hyer & Eickensoht*
ATTORNEYS

United States Patent Office 2,951,255
Patented Sept. 6, 1960

2,951,255
BALL-TYPE PIPELINE DEVICES
Burton Ver Nooy, Tulsa, Okla., assignor to
T. D. Williamson, Inc., Tulsa, Okla.
Filed Dec. 30, 1958, Ser. No. 783,884
4 Claims. (Cl. 15—104.06)

This invention relates to devices for use in scraping paraffin and the like from the inside of a pipeline as well as in separating batches of fluid materials during conveyance through the pipeline. More particularly, it relates to improvements in devices of this type which comprise a ball of resilient material movable longitudinally through the pipeline in sealing engagement therewith.

In such devices, the ball is propelled through the line by the pressure of the fluid on one side thereof. Due to their resiliency, they are especially useful in traversing fittings and restrictions in the line, particularly in the case of sharp miter bends and threaded elbows which prohibit the use of the more conventional type of scrapers.

Although it has been proposed to use solid balls for this purpose, their weight and the volume of rubber which they require renders them too expensive for practical purposes, particularly in large sizes. A hollow ball filled with air or other gas does not provide a solution since there is nothing, other than its own rigidity, to keep the ball round and in engagement with the pipe when subjected to the pressure of the fluid within the pipeline. On the other hand, if the ball were to be filled with liquid, such as water, it would be so heavy as to wear considerably due to excessive rolling and frictional engagement with the pipeline.

An object of this invention is to provide a device of this type which overcomes each of the foregoing shortcomings.

A more particular object is to provide such a device which is inexpensive to manufacture, which will not collapse and which does not wear excessively.

Another object is to provide a device of the type above-described which will traverse severe restrictions in a line.

A further object is to provide a device of this type which automatically compensates for wear.

These and other objects are accomplished, in accordance with the present invention, by a ball-type device for scraping or separating batches within a pipeline which comprises a hollow ball of resilient material movable longitudinally within the pipeline in sealing engagement therewith and at least one hollow ball of relatively rigid material contained within the first-mentioned ball to provide a space therebetween. Each of the last-mentioned balls is filled with gas and the space is filled with liquid.

Since the inner ball or balls are relatively rigid, and the space between them is filled with liquid, the device as a whole is incompressible and will not collapse due to pressures within the line. On the other hand, the gas-filled inner ball or balls lighten the overall device so that there is less wear due to its rolling and frictional engagement with the pipe. In this latter respect, the relative proportions of liquid and gas may be so adjusted as to render the device at least substantially weightless in the line fluid so that wear is reduced to a minimum.

The inner ball or balls define the limit to which the device may be compressed in traversing a restriction in the line. Thus, the use of two or more such balls enables greater elongation of the outer ball so that it may traverse a correspondingly smaller opening through the line. The use of two or more balls also facilitates adjustment of the weight of the device.

It is also contemplated that the liquid in the aforementioned space may contain gas so that the outer ball will expand to compensate for wear on its outer surface.

In the drawings, wherein like reference characters are used throughout to designate like parts:

Figure 1:
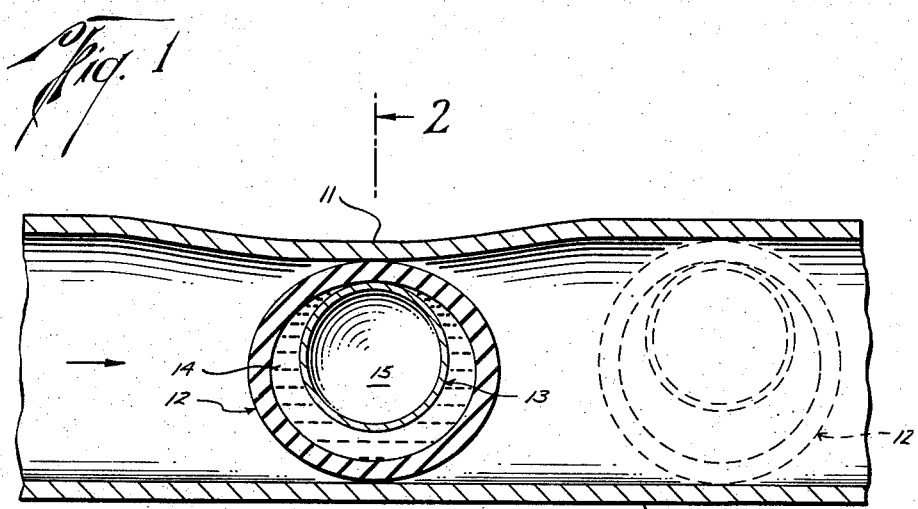
Fig. 1 is a longitudinal sectional view of a pipeline and a ball-type device constructed in accordance with this invention, said device being shown in solid lines during passage through an out-of-round portion of the pipeline and in broken lines during passage through the normally round diameter thereof.

Referring now to the above-described drawings, there is shown in Fig. 1 a pipeline 10 having an inwardly bent portion 11 in the top therein causing its diameter to be out-of-round. Such a restriction may be caused, for example, by the movement of heavy machinery or the like over the top of the pipeline.

Disposed within the pipeline is the first-described form of the invention which comprises an outer hollow ball 12 of resilient material, such as rubber, of such thickness that it will normally maintain its spherical shape. Thus, although it may be flattened as it traverses the restriction, it will reassume its spherical shape as it moves into the round diameter of the pipeline, as shown in broken lines in Fig. 1. Also, of course, the outer ball 12 may be stretched in a longitudinal direction so as to traverse restrictions having smaller overall cross-sectional areas than that of the normal diameter of the line.

As previously described, devices of this type are moved longitudinally through the pipeline, as from left to right in Fig. 1, by means of fluid pressure behind them. Thus, the outer diameter of the ball 12 is slightly greater than the inner diameter of the line so that it sealingly engages with the pipeline during such movement. As also described, such devices are useful both in scraping paraffin or the like from the inner walls of the pipeline which they engage as well as in separating batches of fluid material in each side thereof during travel through the pipeline. In either case, the balls maintain sealing engagement with the pipeline because of their ability to deform, in the manner mentioned in the foregoing paragraph, and then return to their normal spherical shape.

Figures 2, 3:
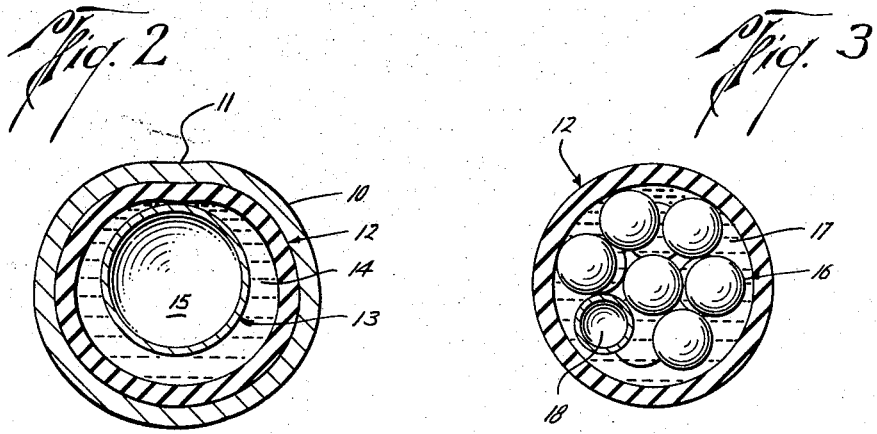
Fig. 2 is a cross-sectional view of the device of Fig. 1, taken substantially along broken line 2—2 thereof, during its traverse of the out-of-round portion.
Fig. 3 is a sectional view of another form of ball-type device constructed in accordance with the present invention and removed from a pipeline, some of the inner balls being shown in elevation.

An inner hollow ball 13 of metal of other relatively rigid material is disposed within the outer ball 12 of the device of Figs. 1 and 2 to provide a space 14 therebetween which is filled with liquid. As previously mentioned, this renders the overall device incompressible such that it will not be collapsed due to fluid within the line.

The interior 15 of the inner ball 13 is filled with a suitable gas so that the weight of the overall device is reduced below that which it would be if the outer ball were entirely filled with liquid. More particularly, the liquid within the space 14 and gas within the interior ball 13 are so proportioned as to render the device at least substantially weightless in the fluid being conveyed through the pipeline. Thus, the inner ball 13 rests along the top of the outer ball 12, as shown in Figs. 1 and 2, since the weight of the metal ball with the gas contained therein is less than that of the liquid displaced within the outer ball 12. In this manner, there will be a minimum of rubbing and rolling of the outer ball over the interior of the pipeline so that there will be little wear.

As will be appreciated from Figs. 1 and 2, the restrictions which the first form of the invention will traverse cannot be smaller than the outside diameter of the inner ball plus two thicknesses of the outer ball. Therefore, it is contemplated that two or more inner balls 16 may be disposed within the outer ball 12, as shown in the embodiment of Fig. 3. As in the case of the first form of the invention, these inner balls provide a space 17 within the outer ball which is filled with liquid; and the interior 18 of each of the inner balls 16 is filled with a suitable gas, the proportion of liquid and gas being adjustable in the manner previously described to render the overall device substantially weightless.

It will be understood that as the device of Fig. 3 traverses a restriction, the inner balls 16 will adjust themselves within the space 17 so as to permit the outer ball 12 to flatten into the shape necessary for traversing same. However, the outer ball may be flattened out to a greater extent than it would, for example, if only a single inner ball 13 of a volume equal to the total volume of the inner balls 16 thus permitting it to traverse smaller restrictions than the Figs. 1 and 2 device. There may be as many balls 16 as desired, as long as they do not become so small that their total weight is too large for all practical purposes.

Of course, there may be some wear upon the outer ball 12 due to a slight amount of rolling and rubbing as it travels through the pipeline. However, such wear is substantially less severe than would occur in a liquid filled or solid ball-type device. Furthermore, whatever wear does take place may be compensated for, at least to some extent, by the use of gas within the liquid in the space 14, such gas expanding the inner diameter of the outer ball to maintain its outer diameter in engagement with the pipeline despite such wear.

As has already been mentioned, the use of a plurality of inner balls provides a convenient means for adjusting the weight of the overall device. In this respect, it is contemplated that the outer ball may be molded about the inner ball or balls by any well-known process. Alternatively, the outer ball may be provided with an access opening to receive the inner balls and such opening closed during assembly of the device.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A ball-type device for scraping a pipeline or separating batches within a pipeline, comprising a hollow ball of resilient material movable longitudinally through the pipeline in sealing engagement therewith, at least one hollow object of relatively rigid material filled with gas and contained within the ball to provide a space therebetween, and liquid filling the space.

2. A device of the character defined in claim 1, wherein there are a plurality of inner objects.

3. A device of the character defined in claim 1, wherein there is gas within the liquid filling said space.

4. A ball-type device for scraping a pipeline or separating batches within a pipeline during movement longitudinally thereof, comprising a hollow ball of resilient material having an outside diameter closely fittable within the pipeline for sealing therewith, and at least one hollow object of relatively rigid material filled with gas and disposed within the ball to provide a space therebetween, the space being filled with liquid, and said gas and liquid being proportioned to render the device substantially weightless in the line fluid.

References Cited in the file of this patent

UNITED STATES PATENTS

| | | |
|---|---|---|
| 2,258,174 | Chawner | Oct. 7, 1941 |
| 2,478,961 | Wortham | Aug. 16, 1949 |
| 2,668,307 | Preen | Feb. 9, 1954 |
| 2,705,419 | Chawner | Apr. 5, 1955 |